(12) United States Patent
Kuriyama

(10) Patent No.: US 8,767,093 B2
(45) Date of Patent: Jul. 1, 2014

(54) IMAGE-CAPTURING DEVICE, IMAGE REPRODUCTION DEVICE, AND IMAGE REPRODUCTION METHOD

(75) Inventor: Takashi Kuriyama, Yokohama (JP)

(73) Assignee: Nikon Corporation, Tokyo (JP)

( * ) Notice: Subject to any disclaimer, the term of this patent is extended or adjusted under 35 U.S.C. 154(b) by 329 days.

(21) Appl. No.: 13/152,785

(22) Filed: Jun. 3, 2011

(65) Prior Publication Data

US 2011/0310274 A1 Dec. 22, 2011

(30) Foreign Application Priority Data

Jun. 22, 2010 (JP) ................................. 2010-141278

(51) Int. Cl.
 *H04N 5/76* (2006.01)
 *H04N 9/68* (2006.01)
 *H04N 5/262* (2006.01)

(52) U.S. Cl.
 USPC ............... 348/231.99; 348/240.99; 348/240.2

(58) Field of Classification Search
 CPC ... G06T 2210/22; G06T 1/0064; G06T 11/60; G06T 15/30; H04N 1/3872; H04N 1/3873; H04N 19/00
 USPC ............................................ 348/231.99–239
 See application file for complete search history.

(56) References Cited

U.S. PATENT DOCUMENTS

| | | | | |
|---|---|---|---|---|
| 5,966,122 A | * | 10/1999 | Itoh | 715/838 |
| 7,272,785 B2 | * | 9/2007 | Fukuda et al. | 715/234 |
| 7,941,002 B2 | * | 5/2011 | Samadani et al. | 382/298 |
| 2004/0264793 A1 | * | 12/2004 | Okubo | 382/243 |
| 2005/0179790 A1 | * | 8/2005 | Nakajima et al. | 348/231.3 |
| 2007/0279492 A1 | * | 12/2007 | Ohnishi | 348/143 |
| 2008/0174680 A1 | * | 7/2008 | Ogino | 348/231.99 |
| 2008/0297629 A1 | * | 12/2008 | Kitani | 348/247 |

(Continued)

FOREIGN PATENT DOCUMENTS

| | | |
|---|---|---|
| JP | A-2004-120341 | 4/2004 |
| JP | A-2004-128715 | 4/2004 |
| JP | A-2007-336257 | 12/2007 |
| JP | A-2008-28890 | 2/2008 |

OTHER PUBLICATIONS

Jul. 17, 2012 Office Action issued in Japanese Patent Application No. 2010-141278 (with translation).

(Continued)

*Primary Examiner* — Timothy J Henn
*Assistant Examiner* — Pritham Prabhakher
(74) *Attorney, Agent, or Firm* — Oliff PLC

(57) ABSTRACT

An image-capturing device includes: an image sensor that captures an image of a photographic subject and outputs the image; an image size conversion unit that converts a whole of the image outputted from the image sensor to an entire region image having a lesser number of pixels than a number of pixels of the whole of the image; a cutting out region setting unit that sets a cutting out region for a partial region image to be cut out from the image outputted from the image sensor; an image cutting out unit that cuts out the partial region image corresponding to the cutting out region from the image outputted from the image sensor; and a recording control unit that records the entire region image converted by the image size conversion unit and the partial region image cut out by the image cutting out unit in an image recording unit, while establishing a relation to each other.

12 Claims, 9 Drawing Sheets

(56) References Cited

U.S. PATENT DOCUMENTS

| | | | |
|---|---|---|---|
| 2009/0021633 A1* | 1/2009 | Fukumoto et al. | 348/362 |
| 2009/0080801 A1* | 3/2009 | Hatfield et al. | 382/283 |
| 2009/0128646 A1* | 5/2009 | Itoh | 348/220.1 |
| 2010/0259647 A1* | 10/2010 | Gann | 348/239 |

OTHER PUBLICATIONS

Apr. 17, 2012 Japanese Office Action issued in Japanese Patent Application No. 2010-141278 (with translation).

* cited by examiner

IMAGE-CAPTURING DEVICE, IMAGE REPRODUCTION DEVICE, AND IMAGE REPRODUCTION METHOD

INCORPORATION BY REFERENCE

The disclosure of the following priority application is herein incorporated by reference: Japanese Patent Application No. 2010-141278 filed Jun. 22, 2010.

BACKGROUND OF THE INVENTION

1. Field of the Invention

The present invention relates to an image-capturing device, to an image reproduction device, and to an image reproduction method.

2. Description of Related Art

An image-capturing device is per se known that, while an entire image is being displayed upon a screen at low resolution for checking the angle of view, according to a requirement for helping a photographer with focus adjustment, overlays a magnified image consisting of a portion of this entire image over this entire image, so as to allow the photographer to confirm the focusing state by looking at this magnified partial image.

SUMMARY OF THE INVENTION

However, the above described prior art image-capturing device only displays the magnified partial image for checking focusing in order for focus adjustment to be performed when an image is to be captured, and does not record the entire image and the magnified partial image in mutual correspondence, so that during reproduction, even if required, it is not possible to reproduce the entire image with the magnified partial image superimposed thereupon.

According to the 1st aspect of the present invention, an image-capturing device comprises: an image sensor that captures an image of a photographic subject and outputs the image; an image size conversion unit that converts a whole of the image outputted from the image sensor to an entire region image having a lesser number of pixels than a number of pixels of the whole of the image; a cutting out region setting unit that sets a cutting out region for a partial region image to be cut out from the image outputted from the image sensor; an image cutting out unit that cuts out the partial region image corresponding to the cutting out region from the image outputted from the image sensor; and a recording control unit that records the entire region image converted by the image size conversion unit and the partial region image cut out by the image cutting out unit in an image recording unit, while establishing a relation to each other.

According to the 2nd aspect of the present invention, in the image-capturing device according to the 1st aspect, it is preferred that the recording control unit establishes the relation between the entire region image and the partial region image with time information when capturing the image by the image sensor and with position information for the cutting out region of the partial region image, and records information of the relation in the image recording unit.

According to the 3rd aspect of the present invention, in the image-capturing device according to the 1st aspect, it is preferred that: the image-capturing device further comprises a display unit that displays the entire region image converted by the image size conversion unit, and an operation member that sets any desired position upon the entire region image displayed on the display unit; and the cutting out region setting unit sets the cutting out region for the partial region image while taking the position set with the operation member as center.

According to the 4th aspect of the present invention, in the image-capturing device according to the 3rd aspect, it is preferred that: the image-capturing device further comprises a pattern storage unit that stores a pattern of the partial region image corresponding to the position set by the operation member; and the cutting out region setting unit searches a partial image having a pattern same as the pattern stored in the pattern storage unit within each of images that are repeatedly captured by the image sensor, and sets a region of the partial image as the cutting out region.

According to the 5th aspect of the present invention, in the image-capturing device according to the 1st aspect, it is preferred that: the image-capturing device further comprises a pattern storage unit that stores a pattern of an image of a person; and the cutting out region setting unit searches a partial image having a pattern same as the pattern stored in the pattern storage unit within each of images that are repeatedly captured by the image sensor, and sets a region of the partial image as the cutting out regions.

According to the 6th aspect of the present invention, in the image-capturing device according to the 1st aspect, it is preferred that the recording control unit records a differential between data of an image of a region that corresponds to the partial region image within the entire region image and data of the partial region image, in the image recording unit as recorded data for the partial region image.

According to the 7th aspect of the present invention, an image reproduction device comprises: an input unit that inputs an entire region image resulting from conversion of a whole of an image captured by an image sensor into an image having a lesser number of pixels than a number of pixels of the whole of the captured image, a partial region image that results from cutting out a portion of the captured image, and relation information that establishes a relation between the entire region image and the partial region image; an image combination unit that combines the partial region image upon the entire region image according to the relation information; and a display control unit that displays an image combined by the image combination unit upon a display unit.

According to the 8th aspect of the present invention, in the image reproduction device according to the 7th aspect, it is preferred that the image combination unit recognizes the relation between the entire region image and the partial region image with position information for the cutting out region of the partial region image within the captured image, and time information when capturing the captured image, and combines the partial region image upon the entire region image.

According to the 9th aspect of the present invention, an image reproduction method comprises: inputting an entire region image resulting from conversion of a whole of an image captured by an image sensor into an image having a lesser number of pixels than a number of pixels of the whole of the captured image, a partial region image that results from cutting out a portion of the captured image, and relation information that establishes a relation between the entire region image and the partial region image; combining the partial region image upon the entire region image according to the relation information; and displaying an image combined by the image combination unit upon a display unit.

According to the 10th aspect of the present invention, in the image reproduction method according to the 9th aspect, it is preferred that in the combining, the relation between the entire region image and the partial region image is recognized with position information for the cutting out region of the partial region image within the captured image, and time information when capturing the captured image, and the partial region image is combined upon the entire region image.

According to the 11th aspect of the present invention, a computer program product includes a reproduction program causing a computer to execute an image reproduction method according to the 9th aspect.

DESCRIPTION OF THE PREFERRED EMBODIMENTS

Embodiment 1

Now a first embodiment will be explained, in which the image-capturing device of the present invention is applied to moving image photography (i.e. video photography or movie shooting) by a digital camera. It should be understood that the application of the image-capturing device of the present invention is not limited to a digital camera; it could also be applied to any image-capturing device that is capable of photographing a moving image, such as, for example, a video camera or the like. Moreover, of course, the image-capturing device of the present invention could also be applied to still image photography.

Figure 1:
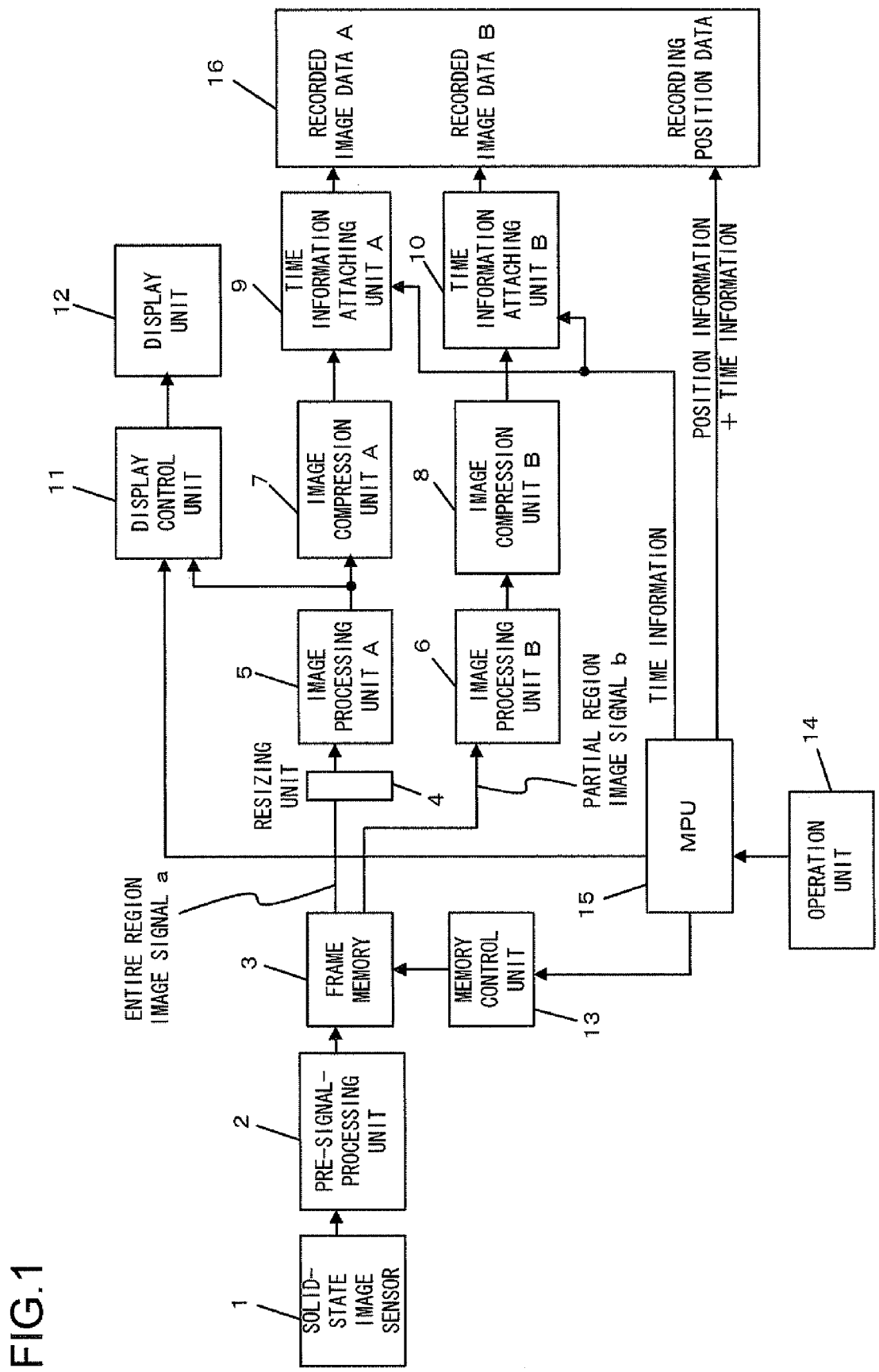
FIG. 1 is a figure showing the structure of a digital camera according to a first embodiment of the present invention.
Figure 2:
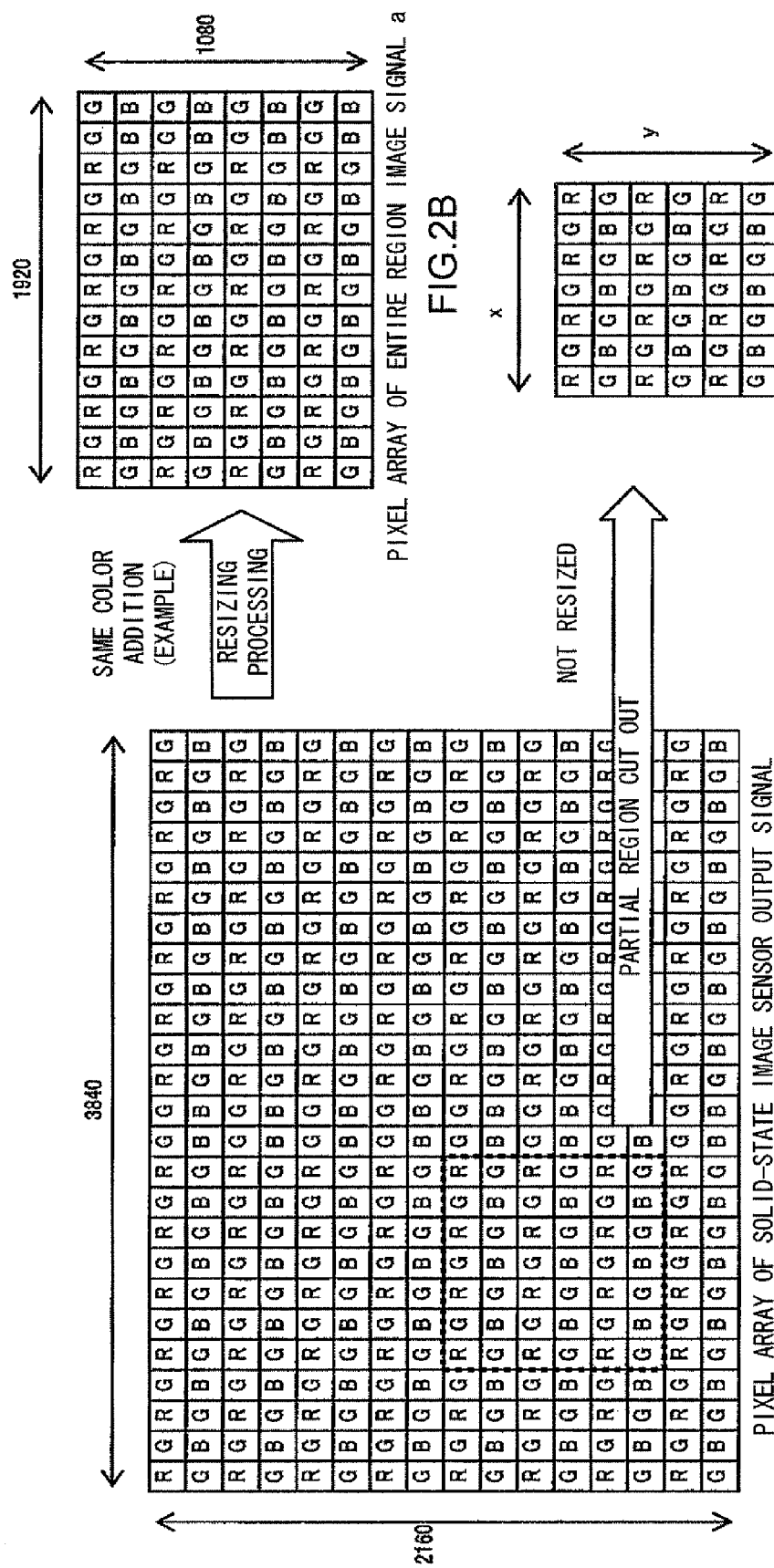
FIGS. 2A through 2C are figures showing examples of a captured image, an entire region image that results from resizing of this captured image, and a partial region image that results from cutting out a portion of this captured image.

FIG. 1 is a figure showing the structure of the digital camera of the first embodiment. In FIG. 1, elements, circuitry, and sections of the digital camera that have no direct relationship with the image-capturing device of the present invention are omitted, and explanation thereof will also be omitted. A solid-state image sensor 1 is an image sensor (an image-capturing unit) in which predetermined numbers of red pixels R, green pixels and blue pixels B that repeatedly output color image signals of about eight million pixels are arranged vertically (i.e. in the vertical direction when the camera is held in its standard position) and horizontally (i.e. in the horizontal direction when the camera is held in its standard position) in a Bayer array; for example, as shown in FIG. 2A, this Bayer array may be formed to have 3840 pixels horizontally and 2160 pixels vertically. It should be understood that an image of a photographic subject is formed upon an image formation surface of this solid-state image sensor 1 by a photographic lens not shown in the figure. A pre-signal-processing unit 2 performs pre-signal-processing upon the image signal outputted from the solid-state image sensor 1, such as black level clamp processing, pixel defect correction, fixed pattern noise elimination, and so on. And a frame memory 3 temporarily stores the image signal that has been initially processed in this manner.

In this embodiment, along with an image signal having 1920 pixels horizontally by 1080 pixels vertically as shown in FIG. 2B and corresponding to the entire photographic scene, in other words an image signal (a) covering the entire photographic region, being generated from the image signal having approximately 8,000,000 pixels shown in FIG. 2A that has been read out from the solid-state image sensor 1 by performing resizing processing upon this image signal by a per se known method such as a same color addition method or the like, also a partial region is cut out from the image captured by the solid-state image sensor 1 without resizing processing being performed, so as to generate a partial region image signal (b) having x pixels horizontally by y pixels vertically, as shown in FIG. 2C. Both this entire region image signal (a) and this partial region image signal (b) are images in which RGB pixels are arranged in a Bayer array. It should be understood that the numbers of pixels in the entire region image signal (a) and in the partial region image signal (b), and the arrangement of their RGB pixel arrays, are not to be considered as being limited to those shown in FIGS. 2A-2C.

Figure 3:
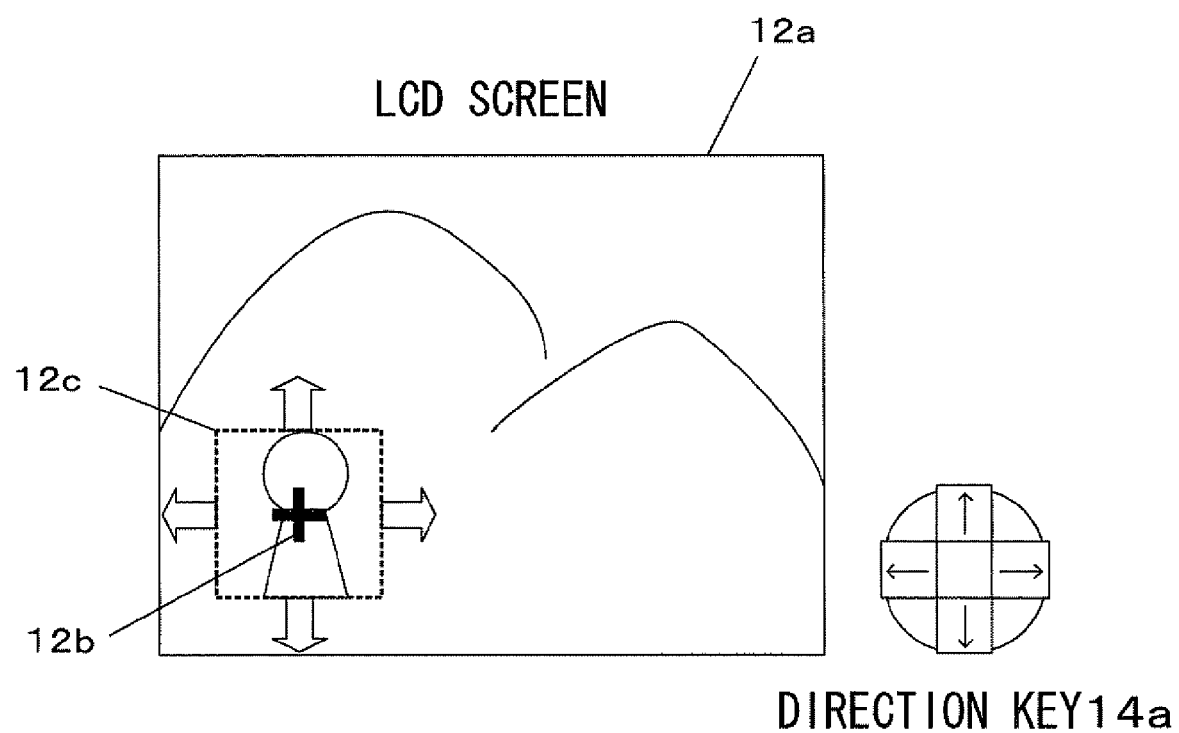
FIG. 3 is a figure showing a procedure for cutting out the partial region image from the captured image.

By the photographer actuating a direction key 14a of the camera, a cursor 12b for setting the position at which the partial region image signal (b) is to be cut out is shifted, as shown in FIG. 3, upwards, downwards, leftwards, and rightwards upon an LCD screen 12a of a display unit 12 (refer to FIG. 1) that displays the entire region image signal (a), and in this manner the position at which the partial region image signal (b) is to be cut out is set. At this time, a partial region image frame 12c shifts together with the shifting of the cursor 12b, and this displays the cutting out region for the partial region image signal (b) within the entire region image signal (a).

In FIG. 1, a resizing unit 4 reads out the entire region image signal (a) shown in FIG. 2B from the captured image signal that is stored in the frame memory 3 according to a per se known resizing method such as, for example, a same color addition method or the like. It should be understood that this resizing method is not to be considered as being limited to being a same color addition method; any resizing method would be acceptable, provided that it is a method that is capable of uniformly reducing the number of pixels in the vertical direction and in the horizontal direction from the image of the entire photographic scene that is captured by the solid-state image sensor 1.

An image processing unit A 5 generates a color image signal that includes the luminance signal and the chrominance (color-difference) signal created from the Bayer array of the entire region image signal (a) after resizing. On the other hand, an image processing unit B 6 reads out, from the captured image signal that is stored in the frame memory 3, the partial region image signal (b) of a predetermined size centered upon the cutting out position that was set with the direction key 14a without resizing it, and generates a color image signal that includes the luminance signal and the chrominance (color-difference) signal created from the Bayer array of this partial region image signal (b).

And an image compression unit A 7 performs compression processing for video (moving image) upon the image signal for the entire region. On the other hand, an image compression unit B 8 performs compression processing for video (moving image) upon the partial region image signal. And a time information attaching unit A 9 attaches time information such as a time code or the like to the image signal for the entire region, and outputs the result as recorded image data A for the entire region to some recording medium, for example to a memory card 16. Moreover, a time information attaching unit B 10 attaches time information such as a time code or the like to the image signal for the partial region, and outputs the result as recorded image data B for the partial region to the memory card 16.

The display control unit 11 generates an image signal for display from the image signal of the entire region, and displays this upon the LCD screen 12a of the display unit 12 (refer to FIG. 3). And, along with controlling the writing of the image signal captured by the solid-state image sensor 1 to the frame memory 3, the memory control unit 13 also controls the reading out of the entire region image signal (a) and of the partial region image signal (b) centered at the set cutting out position from the image signal stored in the frame memory 3.

The operation unit 14 includes the direction key 14a described above (refer to FIG. 3) and operation members for the camera of various types such as a photographic mode selector, a shutter release switch, and so on, and performs various types of operation and various types of input for the digital camera. In this first embodiment, as shown in FIG. 3, when the photographer sets the cursor 12b by actuating the direction key 14a to the center position of a partial region within the entire region image that is being displayed upon the LCD screen 12a that he or she desires to be cut out without being resized, then a position is set for cutting out of an image of a partial region of a predetermined size centered around the position of the cursor 12b from the image signal (refer to FIG. 2A) captured by the solid-state image sensor 1. At this time, position information that specifies the cutting out position that has been set is recorded (address information upon the entire region image in the horizontal direction and in the vertical direction).

The MPU 15 includes a memory and peripheral elements such as an A/D converter and so on (not shown in the figures), and performs various types of calculation and control for the digital camera. During video photography, an entire region image signal (a) is read out by the resizing unit 4 from the image for each frame that has been captured by the solid-state image sensor 1, an entire region image signal is generated by the image processing unit A 5 and the image compression unit A 7 performing image processing and compression processing on this signal, information about the time this frame image was captured is appended by the time information attaching unit A9, and the result is recorded upon the memory card 16 as the recorded image data A.

Moreover, simultaneously with the above: the MPU 15 reads out from the image signal for each frame that has been captured by the solid-state image sensor 1, without resizing, a partial region image signal (b) of the predetermined size centered upon the cutting out position that was set by the operation unit 14; a partial region image signal is generated by the image processing unit B 6 and the image compression unit B 8 performing image processing and compression processing on this signal; information about the time that the image of this frame was captured is appended by the time information attaching unit B 10; and the result is recorded upon the memory card 16 as the recorded image data B.

Furthermore, the MPU 15 records the position information for the cutting out position of the partial region image signal (b) that was set by the operation unit 14 and information about the time that the frame image described above was captured as recording position data on the memory card 16.

Figure 4:
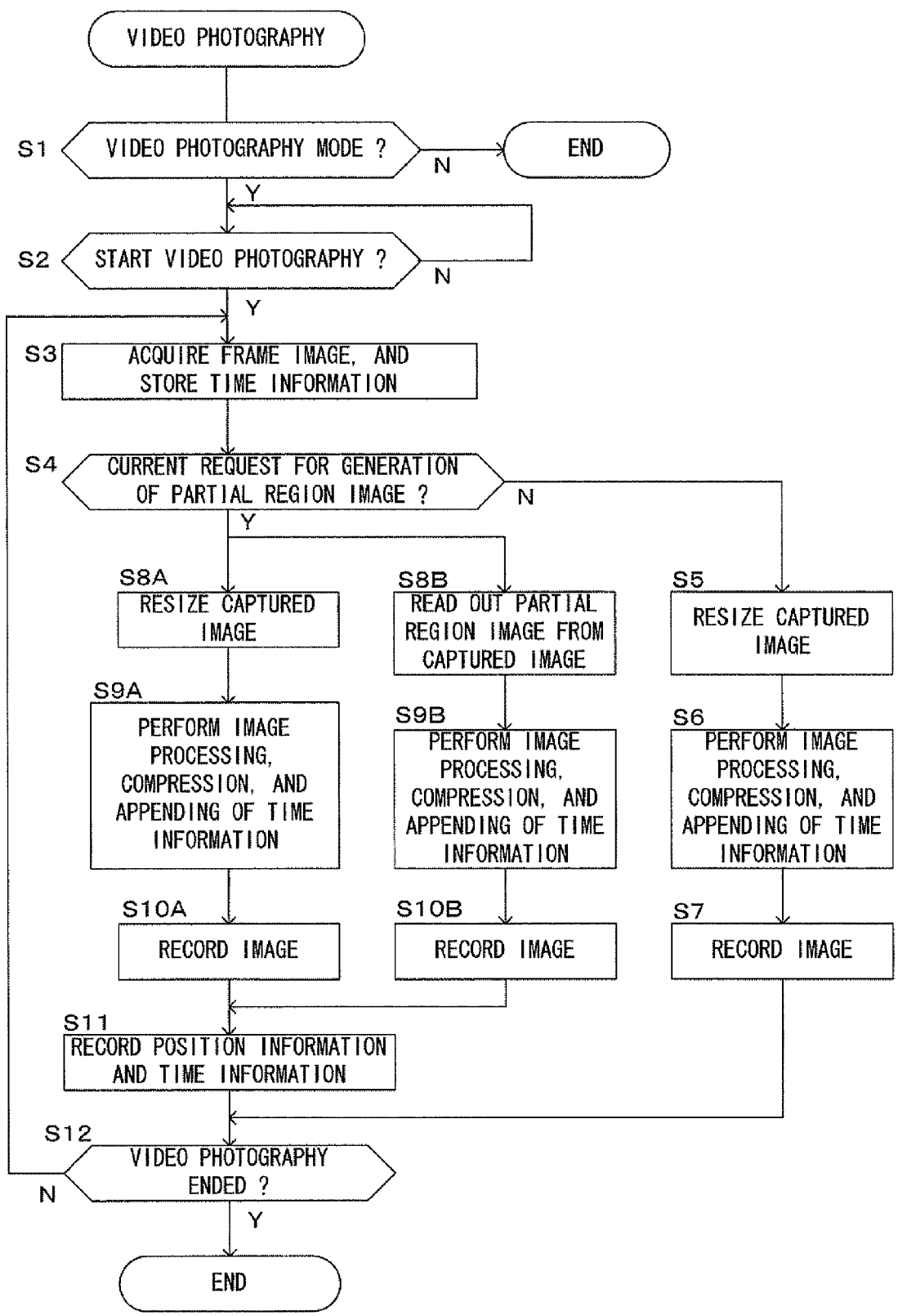
FIG. 4 is a flow chart showing a video photography control program in this first embodiment.

FIG. 4 is a flow chart showing a video photography control program according to this first embodiment of the present invention. This video photography control program is stored in a memory of the MPU 15 (not shown in the figures). The operation of this embodiment to perform video photography will now be explained with reference to this flow chart. It should be understood that operations in the video photography operation of this digital camera that have no direct relationship to the present invention are omitted.

When the video photography mode is selected with a mode selector (not shown in the figures), in a step S1 the MPU 15 starts performing control for video photography. And when, in the next step S2, a shutter release switch (not shown in the figures) of the operation unit 14 for starting video photography is depressed, the flow of control proceeds to a step S3. In this step S3, image capture is performed by the solid-state image sensor 1, the image signal is read out from the solid-state image sensor 1 and pre-signal-processing is performed by the pre-signal-processing unit 2, and the result is stored in the frame memory 3. In the next step S4, a check is made as to whether or not generation of a partial region image is currently being requested. Here if as shown in FIG. 3, a position for cutting out of a partial region image has been set upon the LCD screen 12a by the direction key 14a of the operation unit 14, and an OK switch (not shown in the figures) of the operation unit 14 has been depressed, then the MPU 15 recognizes that a request for generating a partial region image is currently in force.

If there is no current request for generation of a partial region image, then the flow of control is transferred to a step S5, in which the captured image shown in FIG. 2A from the frame memory 3 is resized to high vision size by the resizing unit 4 as shown in FIG. 2B, and thus the entire region image signal (a) is generated. It should be understood that the size of the captured image and its image size after resizing are not to be considered as being limited by the sizes described above for this embodiment. Then in a step S6 various types of image processing, compression processing, and time information appending processing are performed upon the entire region image signal (a) after resizing by the image processing unit A 5, by the image compression unit A 7, and by the time information attaching unit A 9 respectively. And in the next step S7 the resulting entire region image is recorded upon the memory card 16 as the recorded image data A.

After having recorded the entire region image of one frame, the flow of control is transferred to a step S12, in which a check is made as to whether or not the shutter release switch of the operation unit 14 has been released so that video photography is to be ended, and if video photography has ended, then the execution of this video photography control program terminates. Moreover, if the shutter release switch is still being depressed so that video photography is to be continued, then the flow of control returns to the step S3, in which the above described video photography operation is repeated for the next frame image.

On the other hand, if a request for a partial region image is currently in force, then the flow of control proceeds to steps S8A and S8B. Here, if there is a current request for a partial region image, then the entire region image and a partial region image are to be generated simultaneously in parallel. First in the step S8A the captured image shown in FIG. 2A from the frame memory 3 is resized by the resizing unit 4 to the high vision size shown in FIG. 2B, and the entire region image signal (a) is generated. And simultaneously, in the step S8B, the partial region image signal (b) of the predetermined size from within the captured image shown in FIG. 2A and centered upon the partial image cutting out position set in the step S4 is read out from the frame memory 3 (refer to FIG. 2C).

Next in a step S9A various types of image processing, compression processing, and time information appending processing are performed upon the entire region image signal (a) after resizing by the image processing unit A 5, by the image compression unit A 7, and by the time information attaching unit A 9 respectively. And simultaneously, in a step S9B, various types of image processing, compression processing, and time information appending processing are performed upon the partial region image signal (b) by the image processing unit B 6, by the image compression unit B 8, and by the time information attaching unit B 10 respectively. Then in the next step S10A the resulting entire region image is recorded upon the memory card 16 as the recorded image data A. And simultaneously, in a step S10B, the resulting partial region image is recorded upon the memory card 16 as the recorded image data B.

After having recorded the entire region image and also the partial region image of one frame, the flow of control proceeds to a step S11, in which information specifying the partial region image cutting out position set in the step S4 and information specifying the time at which the frame image was acquired in the step S3 are recorded upon the memory card 16 as recording position data. Then the flow of control passes to the step S12 in which, as before, a check is made as to whether or not the shutter release switch of the operation unit 14 has been released so that video photography is to be ended, and if video photography has ended, then the execution of this video photography control program terminates. Moreover, if the shutter release switch is still being depressed so that video photography is to be continued, then as before the flow of control returns to the step S3, in which the above described video photography operation is repeated for the next frame image.

Embodiment 2

A reproduction device that reproduces a video image consisting of an entire region image and a partial region image that have been captured by the digital camera of the first embodiment will now be explained. While in this second embodiment the digital camera shown in FIG. 1 is shown as an example that is being used as a reproduction device, it would also be acceptable for the reproduction device of the present invention to be a dedicated reproduction device such as, for example, a personal computer or a photo frame or the like. In this case, the recorded image data A for the entire region image, the recorded image data B for the partial region image, and the recording position data including position information and time information, that were recorded upon the memory card 16 in the first embodiment, could be loaded via a communication circuit, or could be recorded upon a recording medium such as a CD or the like and then loaded.

Figure 5:
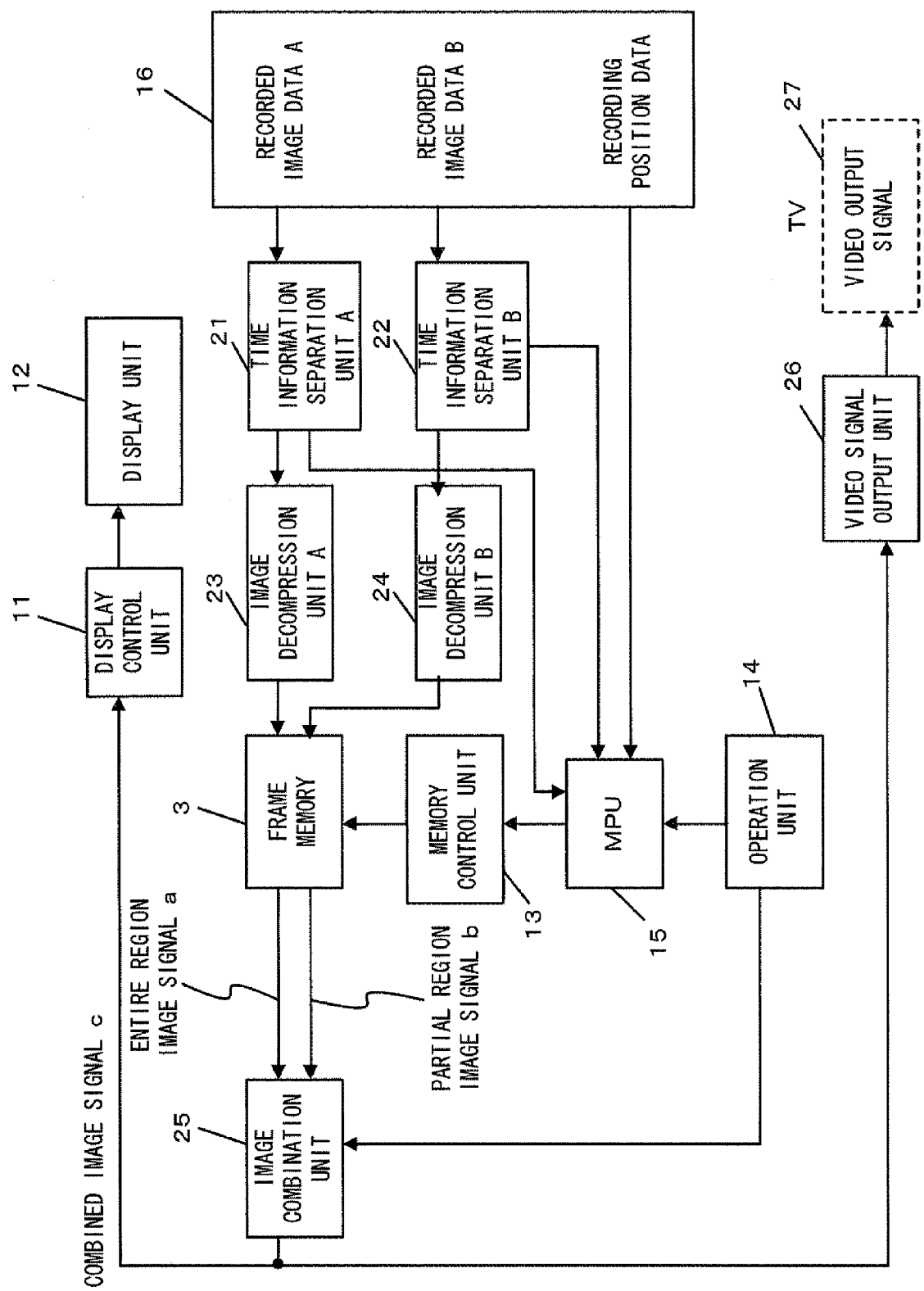
FIG. 5 is a figure showing the structure of a digital camera according to a second embodiment of the present invention, that serves as a reproduction device.

FIG. 5 shows the structure of the digital camera that serves as the reproduction device of this second embodiment. It should be understood that to devices and circuits that are the same as devices and circuits shown in FIG. 1, the same reference symbols are appended, and the explanation will concentrate upon the points of difference. A time information separation unit A 21 separates out the time information that was appended to the recorded image data A for the entire region image during video recording. Moreover, a time information separation unit B 22 separates out the time information that was appended to the recorded image data B for the partial region image during video recording. And an image decompression unit A 23 decompresses the entire region image of the recorded image data A that was compressed during video recording. Moreover, an image decompression unit B 24 decompresses the partial region image of the recorded image data B that was compressed during video recording.

An image combination unit 25 combines together the entire region image signal (a) and the partial region image signal (b), and generates a combined image signal (c) in which the partial region image is superimposed upon the entire region image in the cutting out position. And a video signal output unit 26 generates a video signal from this combined image signal (c), and outputs this video signal to the exterior, for example to a TV device 27.

Figure 6:
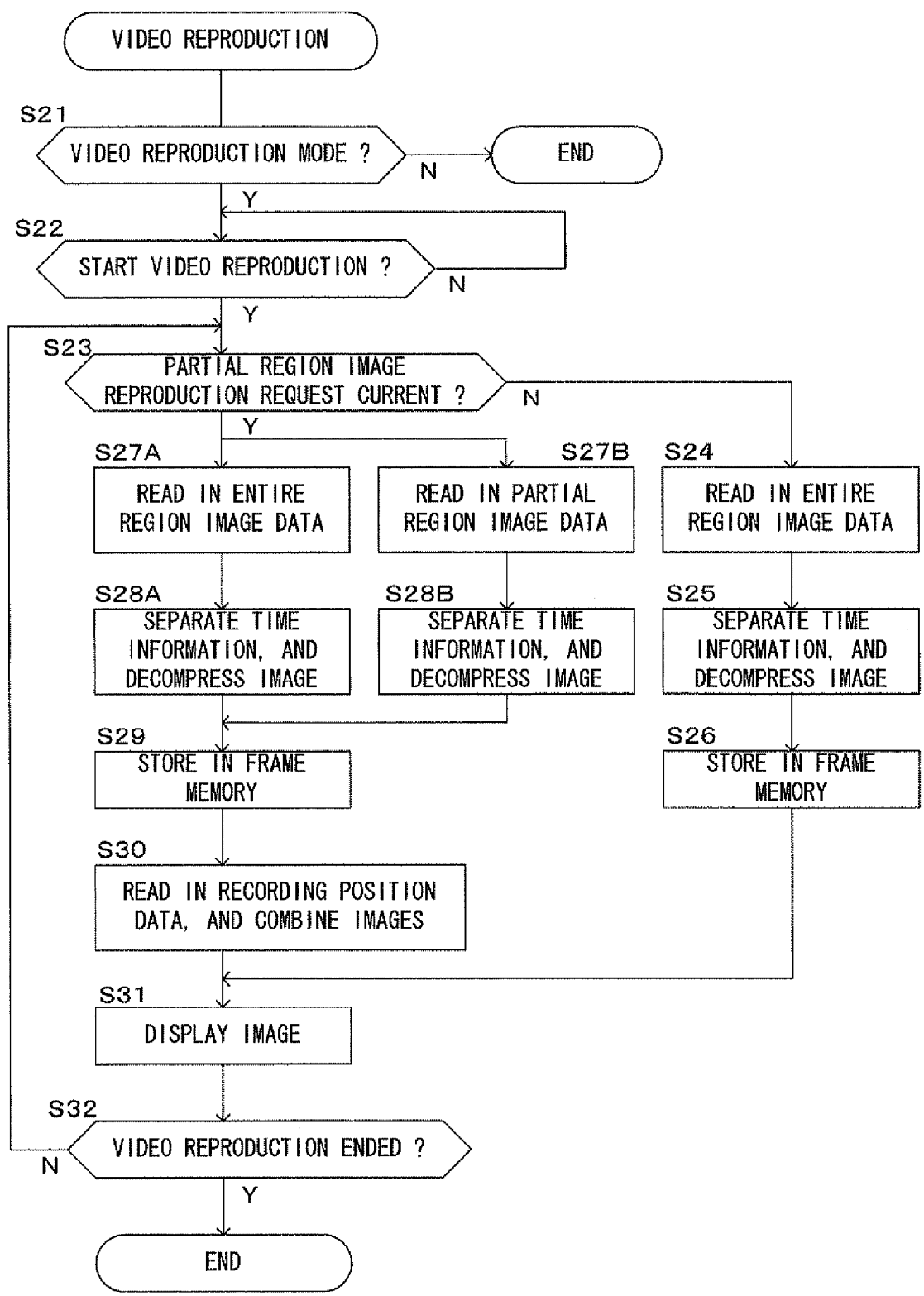
FIG. 6 is a flow chart showing a video reproduction control program in this second embodiment.

FIG. 6 is a flow chart showing the video (moving image) reproduction control program of the second embodiment. This video reproduction control program is stored in a memory of the MPU 15 (not shown in the drawings). The video reproduction operation of the second embodiment will now be explained with reference to this flow chart. It should be understood that, among the video reproduction operations of the digital camera, operations that have no direct relationship with the present invention are not shown in the figure, and explanation thereof is omitted.

In a step S21, the MPU 15 starts video reproduction control when the video reproduction mode is selected with a mode selector (not shown in the figures) of the operation unit 14. In the next step S22, the videos that are recorded upon the memory card 16 are displayed upon the LCD screen 12a of the display unit 12 as a list, and video reproduction starts when the user selects the video that he wishes to reproduce with the direction key 14a of the operation unit 14 and depresses an OK switch (not shown in the figures) of the operation unit 14. Then in a step S23 a decision is made as to whether or not there is a reproduction request for the partial region image. Here, if a zoom up switch (not shown in the figures) of the operation unit 14 is depressed, then the MPU recognizes this as being a reproduction request for a partial region image.

If there is no current request for reproduction of a partial region image, then the flow of control proceeds to a step S24, in which the recorded image data A for the entire region image is read in from the memory card 16, and is temporarily stored in the memory of the MPU 15 (not shown in the figures). Next in a step S25 the time information is separated off from the recorded image data A by the time information separation unit A 21, and decompression into an entire region image is performed by the image decompression unit A 23. Then in a step S26 this entire region image is stored in the frame memory 3. Next the flow of control is transferred to a step S31, in which the entire region image signal (a) is read out in order from the frame memory 3, and is displayed upon the LCD screen 12a of the display unit 12 by the display control unit 11.

Then in a step S32 a decision is made as to whether or not the OK switch of the operation unit 14 (not shown in the figures) is depressed so that video reproduction is to be ended, and if video reproduction is to be ended then the execution of this video reproduction control program is terminated, while if video reproduction is not to be ended, then the flow of control returns to the step S23, and the video reproduction operation described above is repeated.

It should be understood that it would also be acceptable, if partial region image is not to be reproduced to be displayed, a mark at the "cutting out position" on the entire region image that is being displayed upon the LCD screen 12a of the display unit 12 (i.e. at the center position when, during image capture, the partial region image was cut out) for notifying the user that a partial region image is available, on the basis of the position information and the time information of the recording position data read out from the memory card 16.

On the other hand, if there is a current request for reproduction of a partial region image, then the flow of control proceeds to steps S27A and S27B. Here, if there is a reproduction request for a partial region image, then reproduction operation is executed for both the entire region image and the partial region image at the same time, in parallel. First, in the step S27A, the recorded image data A for the entire region image is read in from the memory card 16, and is temporarily stored in the memory of the MPU 15 (not shown in the figures). And simultaneously, in the step S27B, the recorded image data B for the partial region image is read in from the memory card 16, and is temporarily stored in the memory of the MPU 15 (not shown in the figures).

Next, in a step S28A, the time information is separated off from the recorded image data A of the entire region image by the time information separation unit A 21, and decompression into an entire region image is performed by the image decompression unit A 23. And simultaneously, in a step S28B, the time information is separated off from the recorded image data B of the partial region image by the time information separation unit B 22, and decompression into a partial region image is performed by the image decompression unit B 24. Then in a step S29 this entire region image and this partial region image are stored in the frame memory 3.

In a step S30, the recording position data is read in from the memory card 16 and the entire region image and the partial region image are combined by the image combination unit 25 on the basis of the recording position and the image capture time included in the recording position data, and of the time information for the entire region image and for the partial region image that have been separated out from the recorded image data A and from the recorded image data B, and a combined image signal (c) is generated in which the partial region image is superimposed upon the entire region image at the "cutting out position".

Next the flow of control is transferred to the step S31, in which the combined image signal (c) is read out from the image combination unit 25, and is displayed upon the LCD screen 12a of the display unit 12 by the display control unit 11. Then in the step S32 a decision is made as to whether or not the OK switch of the operation unit 14 (not shown in the figures) is depressed so that video reproduction is to be ended, and if video reproduction is to be ended then the execution of this video reproduction control program is terminated, while if video reproduction is not to be ended, then the flow of control returns to the step S23, and the video reproduction operation described above is repeated.

Figure 7:
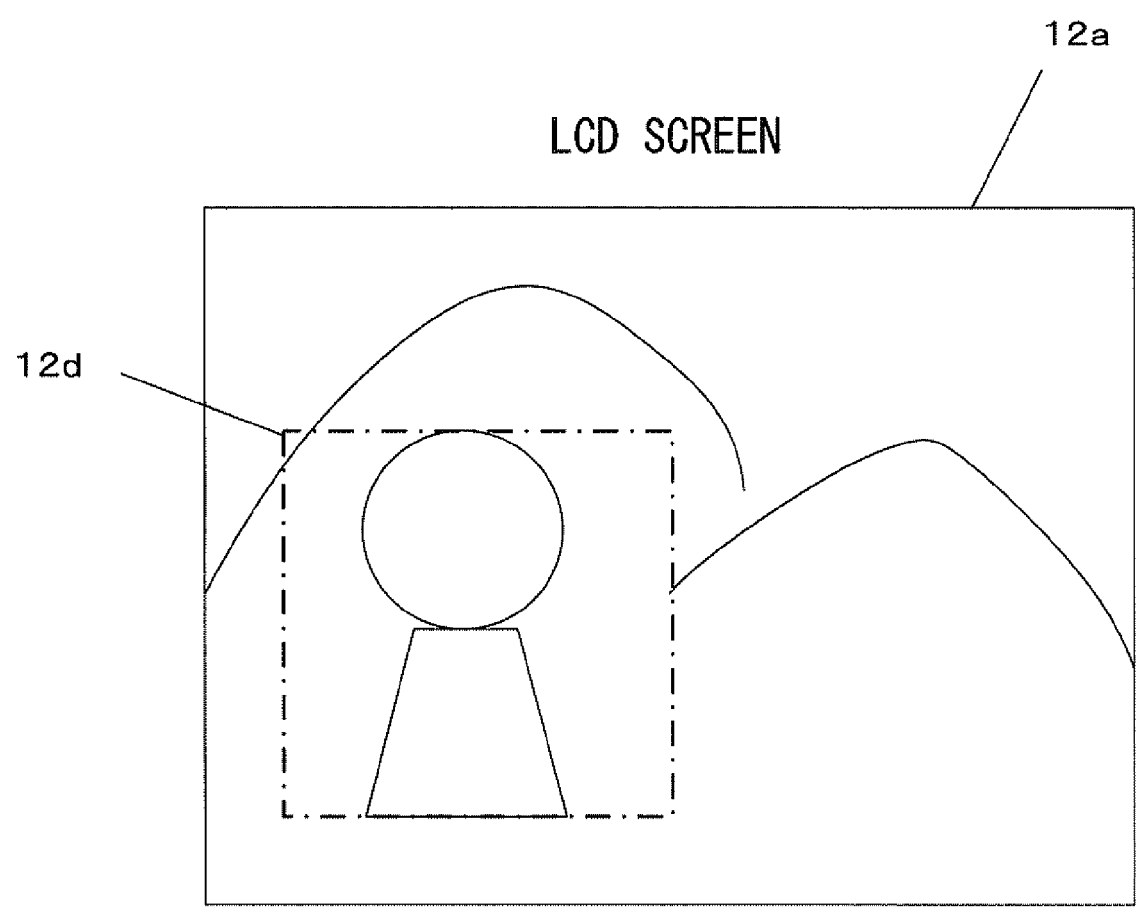
FIG. 7 is a figure showing an example of a combined image that is displayed upon a LCD screen of a display unit.

FIG. 7 shows an example of such a combined image displayed upon the LCD screen 12a of the display unit 12. As shown in this figure, the entire region image is displayed on the entire LCD screen 12a, and the partial region image 12d is displayed in the "cutting out position" for each frame (that the photographer set with the direction key 14a during image capture). When reproducing a video in which, during image capture, the cutting out position changed along with the lapse of time, the cutting out position changes as the reproduction of this video progresses, and along with this the partial region image shifts upon the entire region image.

It should be understood that the shape of the combined frame of the partial region image is not limited to being rectangular as shown in FIG. 7; it would be acceptable to arrange for it to be some other shape such as, for example, circular or the like; and it would also be acceptable to arrange to cut out a main photographic subject portion from the partial region image by contour detection (or edge detection), luminance and color detection, moving body detection or the like, and to combine this with the entire region image.

Figure 8:
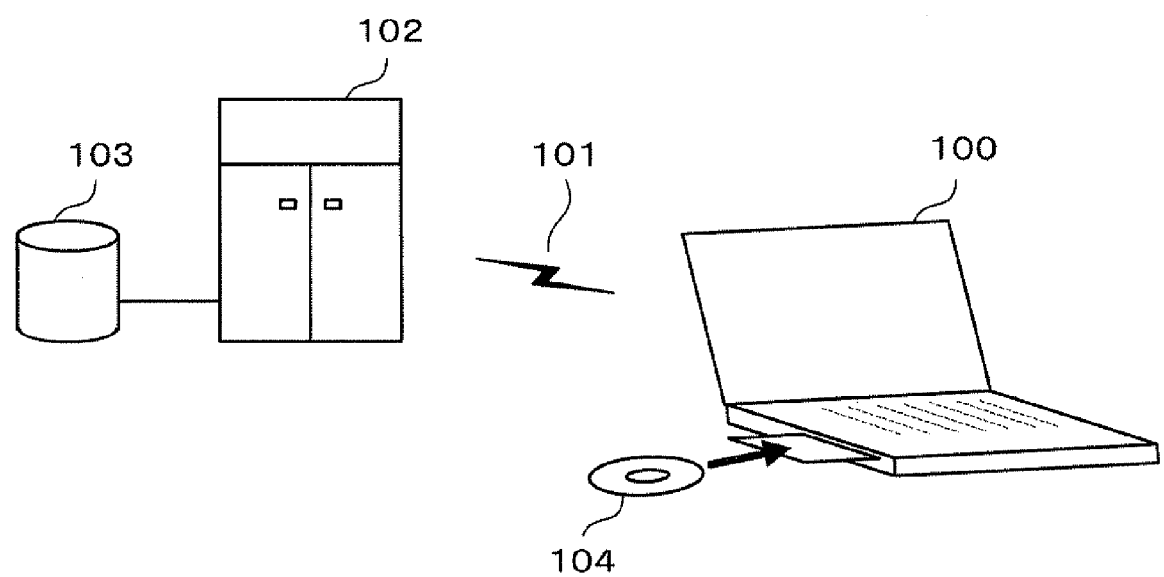
FIG. 8 is a figure showing a method for supply of this video reproduction control program, in this second embodiment.

It would also be possible to construct a reproduction device by executing the video reproduction control program shown in FIG. 6 and described above upon the computer device 100 shown in FIG. 8. When this video reproduction control program is used by being read in by a personal computer 100, then, after the program has been loaded into a data storage device of the personal computer 100, the personal computer may be used as a reproduction device by the program being executed.

This loading of the program onto the personal computer 100 may be performed by loading into the personal computer a recording medium 104 such as a CD-ROM or the like upon which the program is stored; or it may be loaded onto the personal computer 100 by the method of transmitting it via a communication circuit 101 such as a network or the like. If the program is transmitted via a communication circuit 101, then it should be stored on a hard disk device 103 or the like of a server (computer) 102 that is connected to the communication circuit 101. Thus, this video reproduction control program may be supplied as a computer program product in various formats, such as a non-transitory storage medium (or recording medium) 104 or a data signal embodied in carrier waves supplied via the communication circuit 101 or the like.

Embodiment 3

While, in the first embodiment described above, a manual position setting method was disclosed in which, during image capture, the cutting out region for the partial image was set with the direction key 14a of the operation unit 14, a third embodiment will now be explained in which it is arranged to set the cutting out position for the partial region image or the cutting out region itself automatically.

Figure 9:
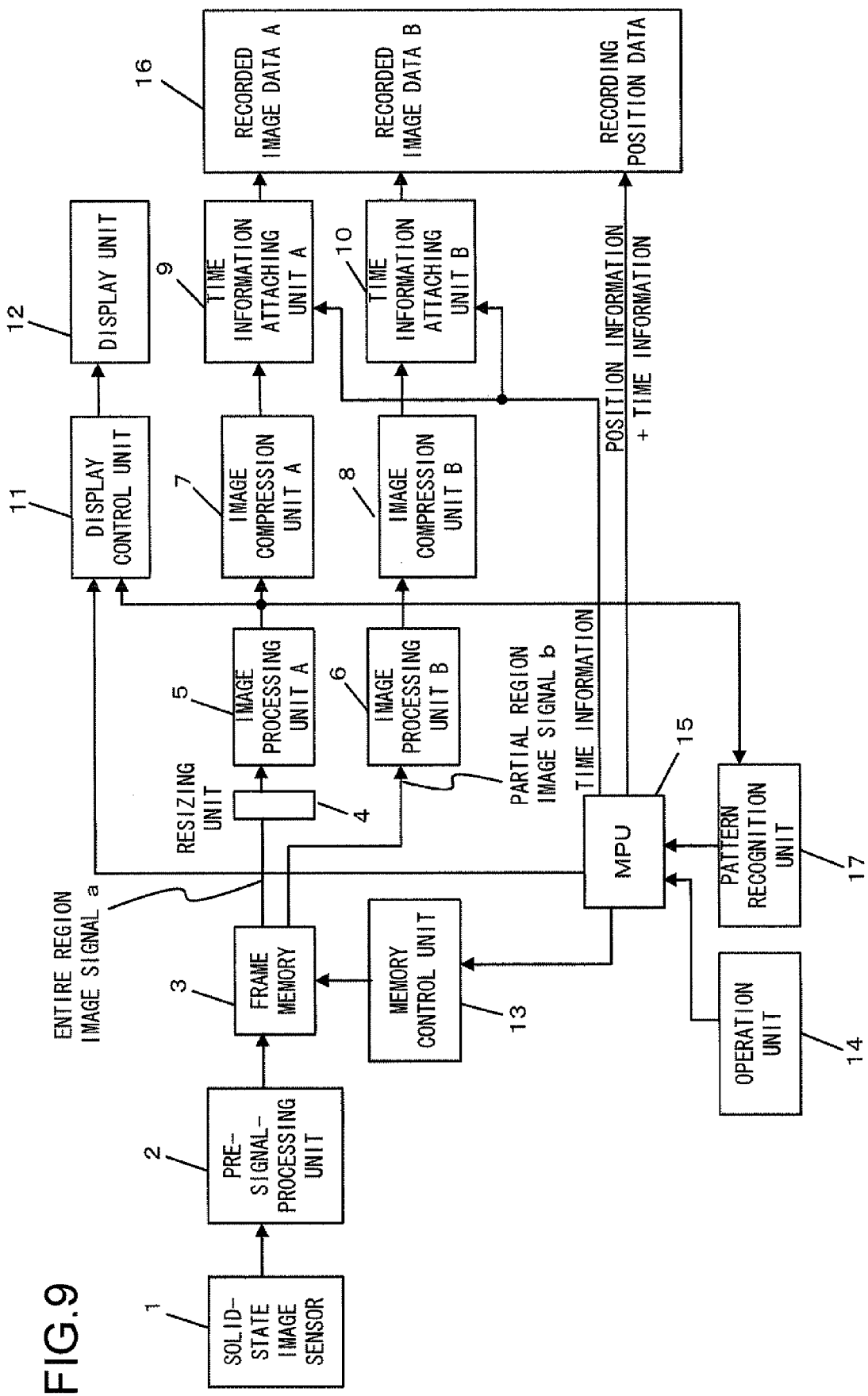
FIG. 9 is a figure showing the structure of a digital camera according to a third embodiment.

FIG. 9 is a figure showing the structure of the digital camera of this third embodiment. In FIG. 9, to devices and circuits that are the same as devices and circuits shown in FIG. 1, the same reference symbols are appended, and the explanation will concentrate upon the points of difference. A pattern recognition unit 17 recognizes the pattern of a partial region of a predetermined size centered at a cutting out position in the entire region image that is set with the direction key 14a of the operation unit 14, and stores this pattern in a memory. After the pattern of the partial region image has been recognized, pattern matching is performed upon the subsequent entire region images that are acquired, and regions having the same pattern as the pattern of the first partial region image are found. If a region having the same pattern is detected, then an image of that region is read out from the captured image as the partial region image.

It should be understood that it would also be acceptable to arrange to recognize and store the patterns of a plurality of people or things from images, to select an image of any one of those persons or things with the operation unit 14 before the start of video photography, to perform pattern matching upon the entire region image using the pattern of the person or thing that has been selected, and to search for a region having the same pattern as the pattern of the image of the person or thing that was selected in advance.

As for the video photography operation of this third embodiment, it is the same as the video photography control shown in FIG. 4 apart from the fact that the cutting out position for the partial region image or the region itself is set automatically, and accordingly no flow chart showing this video photography operation of this third embodiment is shown.

It should be understood that while, in the above described embodiment and its variant embodiments, examples were shown in which an image of a predetermined size centered at a set position was cut out from the captured image as a partial region image, and was recorded as the recorded image data B, it would also be acceptable to arrange to record, as the recorded image data B, the difference from the image signal of a region corresponding to the partial region image signal within the entire image signal. By doing this, it would be possible to reduce the amount of data to be recorded upon the recording medium.

Moreover while, in the above described embodiment and its variant embodiments, examples were shown in which the entire region image signal (a) and the partial region image signal (b) were separated, after having stored the captured image signal in the frame memory after having subjected it to pre-image-processing, and signal processing is performed on the separated signals respectively, it would also be acceptable to arrange, after having performed pre-image-processing upon the captured image signal, to perform signal processing directly upon this image, and to store it in the frame memory.

Yet further while, as shown in FIG. 3, in the above described embodiment and its variant embodiments, examples were shown in which the direction key 14a was used for setting the cutting out position for the partial region image, it would also be acceptable to arrange to provide a touch panel switch upon the display screen 12a, and for the photographer to set the position at which he has touched the screen with his finger as being the cutting out position for the partial region image.

It should be understood that the above described embodiments and variant embodiments thereof may be employed individually; or these embodiments and variant embodiments may be combined in any combination.

According to the above described embodiment and its variant embodiments, it is possible to obtain the following beneficial operational effects. First, since it is arranged to convert the whole of the image captured and outputted by the solid-state image sensor 1 into an entire region image having a lesser number of pixels than the number of pixels in that whole of the image, to set a cutting out region for a partial region image to be cut out from the image outputted from the solid-state image sensor 1, to cut out a partial region image corresponding to this cutting out region from the image outputted from the solid-state image sensor 1, and to establish the relation (or correspondence) between the entire region image and the partial region image and to record them on the memory card 16, accordingly, while resizing the captured image and displaying it as the entire region image, it is possible to combine the partial region image positioned in the set position within the captured image without resizing it and to display the combination, so that, for example, while reproducing an entire region image in which a sports day has been photographed, it is possible to reproduce a partial region image of one child distinctly in magnified form.

And since, according to the above described embodiment and its variant embodiments, it is arranged to establish the relation (or correspondence) between the entire region image and the partial region image with the time information for the image captured by the solid-state image sensor 1 and the position information for the region for cutting out the partial region image, and to record information specifying this relation or correspondence upon the memory card 16, accordingly, during video reproduction, it is possible to establish accurate correspondence between the entire region image and the partial region image.

And since, according to the above described embodiment and its variant embodiments, the direction key 14a is provided that sets any desired position upon the image displayed upon the display unit 12, and since it is arranged for the cutting out region for the partial region image to be cut out to be set as centered upon the position set with this direction key 14a, accordingly it is possible to set a partial image of the region intended by the photographer as the cutting out region.

And since, according to the above described embodiment and its variant embodiments, it is arranged to store a pattern of a partial region image positioned at a location that has been set with the direction key 14a, to search for partial region images having the same pattern from within images that are repeatedly captured by the solid-state image sensor 1, and to set the regions of these partial region images as the cutting out regions, accordingly, if once the image of a photographic subject that has caught the attention of the photographer is set as the partial region image, thereafter a partial region image of this image of the photographic subject will be automatically spotted and set, so that, during video photography, it is possible accurately to track the partial image region of the intended photographic subject, and so that it is possible to enhance the ease of use.

And since, according to the above described embodiment and its variant embodiments, it is arranged to store a pattern of an image of a person, to search for partial region images having the same pattern from within images that are repeatedly captured by the solid-state image sensor 1, and to set the regions of these partial region images as the cutting out regions, accordingly it is possible further to enhance the ease of use, since it is possible to designate some photographic subject to be observed for which a partial region image has been acquired before photography, it is possible to track this partial image region for the photographic subject to be observed automatically when photography is started, and it is possible, during photography, to give undivided attention only to the photography.

And since, according to the above described embodiment and its variant embodiments, it is arranged to record the differential between the image data of the region within the entire region image that corresponds to the partial region image and the data for the partial region image upon the memory card 16 as recorded data for the partial region image, accordingly it is possible to reduce the storage capacity of the memory card 16.

And since, according to the above described embodiment and its variant embodiments, it is arranged to input an entire region image resulting from converting the whole of a captured image outputted from the solid-state image sensor 1 into an image having a lesser number of pixels than the number of pixels in that captured entire image, a partial region image that has been cut out from the captured image, and information specifying a relation (or correspondence) between the entire region image and the partial region image, to combine the partial region image upon the entire region image according to that information, and to display the combined image upon the display unit 12, accordingly, while resizing the whole of the captured image and displaying it as the entire region image, it is possible to combine the partial region image into the set position within the captured image without resizing it and to display the resulting combined image, so that it is possible, while reproducing an entire region image of, for example, a sports meeting that has been photographed, also vividly to reproduce in magnified form a partial region image of a child.

The above described embodiments are examples, and various modifications can be made without departing from the scope of the invention.

What is claimed is:

1. An image-capturing device, comprising:
   an image sensor that captures an image of a photographic subject and outputs the image;
   an image size conversion unit that converts a whole of the image outputted from the image sensor to an entire region image having a lesser number of pixels than a number of pixels of the whole of the image;
   a cutting out region setting unit that sets a cutting out region for a partial region image to be cut out from the image outputted from the image sensor;
   an image cutting out unit that cuts out the partial region image corresponding to the cutting out region from the image outputted from the image sensor; and
   a recording control unit that records the entire region image converted by the image size conversion unit, the partial region image cut out by the image cutting out unit not converted by the image size conversion unit, and information of a relation between the entire region image and the partial region image while establishing the relation to each other, in an image recording unit; and
   a display control unit that combines the partial region image not converted by the image size conversion unit onto the entire region image converted by the image size conversion unit at a position corresponding to the partial region image on the entire region image to be displayed, based on the entire region image, the partial region image and the information of the relation recorded in the recording control unit.

2. An image-capturing device according to claim 1, wherein
   the information of the relation comprises time information when capturing the image by the image sensor and position information for the cutting out region of the partial region image.

3. An image-capturing device according to claim 1, further comprising:
   a display unit that displays the entire region image converted by the image size conversion unit; and
   an operation member that sets any desired position upon the entire region image displayed on the display unit, wherein
   the cutting out region setting unit sets the cutting out region for the partial region image while taking the position set with the operation member as center.

4. An image-capturing device according to claim 3, further comprising:
   a pattern storage unit that stores a pattern of the partial region image corresponding to the position set by the operation member, wherein
   the cutting out region setting unit searches a partial image having a pattern same as the pattern stored in the pattern storage unit within each of images that are repeatedly captured by the image sensor, and sets a region of the partial image as the cutting out region.

5. An image-capturing device according to claim 1, further comprising:
   a pattern storage unit that stores a pattern of an image of a person, wherein
   the cutting out region setting unit searches a partial image having a pattern same as the pattern stored in the pattern storage unit within each of images that are repeatedly captured by the image sensor, and sets a region of the partial image as the cutting out regions.

6. An image-capturing device according to claim 1, wherein
   the recording control unit records a differential between data of an image of a region that corresponds to the partial region image within the entire region image and data of the partial region image, in the image recording unit as recorded data for the partial region image.

7. An image-capturing device according to claim 1, wherein
   the image size conversion unit converts the whole of the image outputted from the image sensor to the entire region image having the lesser number of pixels than the number of pixels of the whole of the image to be resized to a smaller image size; and
   the image cutting out unit cuts out the partial region image while maintaining an image size thereof.

8. An image reproduction device, comprising:
   an input unit that inputs an entire region image having undergone resizing conversion of a whole of an image captured by an image sensor into an image having a lesser number of pixels than a number of pixels of the whole of the captured image, a partial region image that results from cutting out a portion of the captured image and does not undergo the resizing conversion, and relation information that establishes a relation between the entire region image and the partial region image;
   an image combination unit that combines the partial region image having not undergone the resizing conversion upon the entire region image having undergone the resizing conversion at a position corresponding to the partial region image on the entire region image according to the relation information; and
   a display control unit that displays an image combined by the image combination unit upon a display unit.

9. An image reproduction device according to claim 8, wherein
   the relation information comprises time information when capturing the image by the image sensor and position information for the cutting out region of the partial region image; and
   the image combination unit recognizes the relation between the entire region image and the partial region image with the position information and the time information of the relation information.

10. An image reproduction method, comprising:
    inputting an entire region image having undergone resizing conversion of a whole of an image captured by an image sensor into an image having a lesser number of pixels than a number of pixels of the whole of the captured image, a partial region image that results from cutting out a portion of the captured image and does not undergo the resizing conversion, and relation information that establishes a relation between the entire region image and the partial region image;
    combining the partial region image having not undergone the resizing conversion upon the entire region image having undergone the resizing conversion at a position corresponding to the partial region image on the entire region image according to the relation information; and
    displaying an image combined by the image combination unit upon a display unit.

11. An image reproduction method according to claim 10, wherein the relation information comprises time information when capturing the image by the image sensor and position information for the cutting out region of the partial region image; and in the combining, the relation between the entire region image and the partial region image is recognized with the position information and the time information of the relation information.

12. A non-transitory computer-readable storage medium that stores a computer-executable program that causes a computer to execute an image reproduction method according to claim 10.

* * * * *